United States Patent Office 3,218,255
Patented Nov. 16, 1965

3,218,255
BEARING COMPOSITION CONTAINING POLYTETRAFLUOROETHYLENE AND AMMONIUM MANGANESE ORTHOPHOSPHATE
George C. Pratt, Wembley, England, assignor to The Glacier Metal Company Limited, Wembley, England, a company of Great Britain
No Drawing. Filed Jan. 9, 1961, Ser. No. 81,264
Claims priority, application Great Britain, Jan. 8, 1960, 825/60; June 7, 1960, 20,005/60
3 Claims. (Cl. 252—12)

This invention relates to plain bearings and materials for making plain bearings, the term "plain bearing" being understood when used herein as including any member or assembly having, or designed to have in use, a surface which bears directly or through a liquid or solid lubricant against another surface relatively to which it has sliding movement, irrespective of whether the main or sole purpose is to transmit a load from one to the other of the surfaces having relative sliding movement or whether the sliding contact is solely or partly for some other purpose such, for example, as to provide a seal. The term thus includes such members as piston rings, piston, cylinders and the cages or separators for ball or roller bearings. The term "bearing material" is to be understood as meaning material from which such a bearing could be made, and the term "plain bearing strip" is used to define a strip of such bearing material or a strip comprising a layer of such bearing material secured to a metal backing, which may for example be formed into a journal bearing by wrapping, coin pressing or some other known process. Similarly the term "lead oxide" is used throughout the specification and claims to include all the oxides of lead.

According to the present invention, a plain bearing material consists of or includes a mixture of one or more thermoplastic or thermosetting plastic materials with a phosphate representing between 2½% and 40% by volume of the whole material, and a proportion representing between 2½% and 40% by volume of the whole material of lead and/or lead oxide and/or graphite, the total percentage content of the phosphate and lead and/or lead oxide and/or graphite referred to herein as the "filler" not exceeding 60% by volume of the whole material.

The plastic material or materials will always therefore represent between 40% and 95% of the bearing material according to the invention.

Where the bearing material according to the invention includes lead, this may either be in the form of powder or fibres, and the phosphate is preferably hydrogen manganese ortho phosphate, iron manganese phosphate, ammonium manganese phosphate or magnesium pyrophosphate.

The method of combining the materials will depend upon the nature of the plastic material or materials and when one or more thermoplastic materials are used, they may be mixed together with or without the fillers, by raising the temperature of the thermoplastic material or materials above their softening point and incorporating other ingredients therewith by mastication, for example in a rubber mill. It will be understood that where the mixture includes more than one thermoplastic material this method cannot be used if the softening temperature of the thermoplastic material which has to form the matrix of the composition is above the temperature at which degradation of a second plastic material included in the composition occurs.

When on the other hand, one or more thermosetting plastic materials are used they may be mixed together in powder form with the fillers by tumbling, or the fillers may be stirred into them while in liquid form.

In a preferred method in which the plastic material comprises or includes polytetrafluoroethylene the fillers are stirred into a dispersion of very fine particles of the plastic material in a liquid, the fillers being maintained in suspension by stirring and the dispersion then being coagulated.

It will further be appreciated that a combination of the methods set forth may be appropriate or necessary when using certain selections of materials.

The invention also includes a plain bearing or plain bearing strip made from bearing material as set forth, and the plain bearing or plain bearing strip may be formed as by moulding, extruding, hot-pressing, casting or otherwise shaping the bearing material (for example in accordance with the method described in the present applicants' co-pending patent application No. 14,785 of 1959).

A plain bearing or plain bearing strip according to the invention may also comprise a metal backing having secured thereto a surface layer of bearing material set forth, and the metal backing may have at least one surface portion which is of porous or pitted form, or has an attached porous layer, such attached porous layer or portion being substantially filled as by impregnation with the bearing material.

In a preferred arrangement a porous layer of bronze is attached to a steel backing by sintering, and a bearing material as set forth fills the pores of the porous layer at least adjacent to the surface which is to constitute a bearing surface.

According to a further aspect of the invention in a method of making a plain bearing or bearing material as set forth, a plain bearing material containing a thermoplastic material is applied by rolling to the backing strip at a temperature above the softening temperature of the thermoplastic material.

When plain bearing material containing a thermosetting plastic material is used it may be applied in an uncured state together with any required curing agent, in liquid or solid form, to the porous backing layer, and then simultaneously cured and bonded to the layer by the application of heat and pressure.

The invention also includes a plain bearing or plain bearing strip made according to the above methods, and also includes a plain bearing made from a plain bearing strip as set forth.

Two examples of methods of making a plain bearing or plain bearing strip according to the invention will now be described.

Example A

In this example a plain bearing is made from a plain bearing strip which comprises a metal backing having a surface coated with a layer of bearing material according to the invention. The bearing material in question includes polytetrafluoroethylene (referred to herein for convenience as P.T.F.E.) and the metal backing is initially mechanically roughened as by shot blasting. The mixture of the materials from which the bearing material is formed is applied to the surface as by spraying, and the backing with the mixture upon it, is then subjected to a curing treatment at a temperature above the transition temperature of P.T.F.E. that is to say about 327° C. The plain bearing strip thus produced is then formed into a journal bearing by wrapping, coin-pressing or some other known process.

Example B

In this example, P.T.F.E. is again applied to a strip of backing material to provide a plain bearing strip which may be formed into a journal bearing as in Example A, but this time in the form of a paste derived from a coagulated dispersion and mixed with the other ingredients to provide a bearing material according to the invention which is applied to the surface of a sintered porous layer on the backing strip by rolling, the layer so applied being subsequently sintered by subjecting it to a temperature above the transition temperature of P.T.F.E.

In the following examples, percentages of the ingredients for suitable bearing materials according to the invention are set forth:

(1) Percent

| | |
|---|---|
| P.T.F.E. | 55 |
| Ammonium manganese orthophosphate | 12 |
| Lead | 33 |

(2) Percent

| | |
|---|---|
| Polyethylene | 65 |
| Ammonium manganese orthophosphate | 10 |
| Lead monoxide | 25 |

(3) Percent

| | |
|---|---|
| Polycarbonate | 60 |
| P.T.F.E. | 24 |
| Ammonium manganese orthophosphate | 8 |
| Lead | 8 |

(4) Percent

| | |
|---|---|
| Polycarbonate | 65 |
| Polyethylene | 25 |
| Hydrogen-manganese orthophosphate | 5 |
| Lead monoxide | 5 |

The appropriate method of applying the particular bearing materials made according to the above examples to a metallic backing strip should, of course, be employed if the bearing materials are used in this manner.

What I claim as my invention and desire to secure by Letters Patent is:

1. A plain bearing material consisting essentially of at least 40% by volume of polytetrafluoroethylene, from 2.5 to 40% by volume of a member selected from a group consisting of lead and oxides of lead, and from 2.5 to 40% by volume of ammonium manganese orthophosphate.

2. A plain bearing material consisting essentially of at least 40% by volume of polyethylene, from 2.5 to 40% by volume of a member of the group consisting of lead and oxides of lead, and from 2.5 to 40% by volume of ammonium manganese orthophosphate.

3. A plain bearing material consisting essentially of at least 40% by volume of a material selected from the group consisting of polytetrafluoroethylene and polyethylene, from 2.5 to 40% by volume of a member selected from the group consisting of lead and oxides of lead and from 2.5 to 40% by volume of ammonium manganese orthophosphate.

References Cited by the Examiner

UNITED STATES PATENTS

| | | | |
|---|---|---|---|
| 2,400,091 | 5/1946 | Alfthan | 252—12 |
| 2,400,099 | 5/1946 | Brubaker et al. | 252—12 |
| 2,585,430 | 2/1952 | Boegehold | 29—192.2 XR |
| 2,588,234 | 3/1952 | Hendricks | 148—6.15 |
| 2,689,380 | 9/1954 | Tait | 29—191.2 X |
| 2,691,814 | 10/1954 | Tait | 29—149.5 |
| 2,777,783 | 1/1957 | Welsh | 29—149.5 |
| 2,790,740 | 4/1957 | Ayers et al. | 148—6.15 |
| 2,798,005 | 7/1957 | Love | 117—132 |
| 2,807,510 | 9/1957 | Shubert et al. | 308—238 |
| 2,813,041 | 11/1957 | Mitchell et al. | 117—132 |
| 2,824,060 | 2/1958 | White | 252—12 |
| 2,838,829 | 6/1958 | Goss et al. | 117—132 |
| 2,865,692 | 12/1958 | Gossman | 308—238 |
| 2,920,972 | 1/1960 | Godron et al. | 106—47 |
| 2,928,801 | 3/1960 | Safford et al. | 260—45.75 |
| 3,056,709 | 10/1962 | Rising et al. | 308 |
| 3,067,135 | 12/1962 | Strub | 252—12 |
| 3,122,505 | 2/1964 | Rulon-Miller et al. | 252—12 |

OTHER REFERENCES

"Phase Diagrams for Ceramists," by Ernest M. Levin et al., page 265 cited, 1956.

Christopher, "Polycarbonate Resin," Society of Plastics Engineers Journal, June 1958, p. 34 cited.

Modern Plastics, pp. 123–128, February 1959, "PTFE Bearing Materials."

EARL M. BERGERT, *Primary Examiner.*

CARL F. KRAFFT, *Examiner.*